US005864195A

United States Patent [19]

George et al.

[11] Patent Number: 5,864,195

[45] Date of Patent: Jan. 26, 1999

[54] STATOR COMPONENT INCLUDING LIMBS PROVIDED WITH RECESSES AT THEIR OUTER SURFACE

[75] Inventors: David Leslie George, Hillingdon; Barrie Gilbert Barker, Hanwell, both of Great Britain

[73] Assignee: Lucas Industries public limited company, Solihull, United Kingdom

[21] Appl. No.: 929,199

[22] Filed: Sep. 8, 1997

[30] Foreign Application Priority Data

Oct. 2, 1996 [GB] United Kingdom .................. 9620563

[51] Int. Cl.[6] .............................. H01F 3/00; H01F 7/08; H02K 1/00

[52] U.S. Cl. ......................... 310/254; 310/216; 310/218; 335/260; 335/279; 29/596; 29/602.1; 336/96

[58] Field of Search .................................. 310/254, 258, 310/179, 216, 217, 218, 43, 89, 259; 335/260, 279; 336/96; 29/596, 602.1

[56] References Cited

U.S. PATENT DOCUMENTS

| | | | |
|---|---|---|---|
| 4,568,021 | 2/1986 | Deckard et al. | 239/88 |
| 5,153,475 | 10/1992 | McSparran | 310/254 |
| 5,155,461 | 10/1992 | Teeman et al. | 335/260 |
| 5,207,410 | 5/1993 | Wakeman | 251/129 |
| 5,397,951 | 3/1995 | Uchida etr al. | 310/156 |
| 5,644,181 | 7/1997 | Kooken et al. | 310/216 |
| 5,708,406 | 1/1998 | Tsunoda et al. | 335/272 |

FOREIGN PATENT DOCUMENTS

| | | |
|---|---|---|
| 3046072A | 9/1981 | Germany . |
| 1055490 | 1/1967 | United Kingdom . |
| 2252675 | 8/1992 | United Kingdom . |
| 2252675 | 11/1994 | United Kingdom . |

OTHER PUBLICATIONS

European Search Report EP 97306735 and Annex to the European Search Report English translation of German Abstract DE3046072.

*Primary Examiner*—Thomas M. Dougherty
*Assistant Examiner*—Tran N. Nguyen
*Attorney, Agent, or Firm*—Trexler, Bushnell, Giangiorgi & Blackstone, Ltd.

[57] ABSTRACT

A stator component is described which comprises first and second limbs defining respective pole faces. Each limb includes an outer surface which is provided with a pair of elongate recesses, each extending in a direction angled to the pole faces. The recesses conveniently intersect one another, and are conveniently formed using a plunge cutting technique.

7 Claims, 2 Drawing Sheets

STATOR COMPONENT INCLUDING LIMBS PROVIDED WITH RECESSES AT THEIR OUTER SURFACE

BACKGROUND

This invention relates to a stator for use in an electromagnetic actuator.

Where an electromagnetic actuator is used to control the operation of, for example a fuel injector, it is known to encapsulate the stator component of the actuator together with the windings associated therewith in a moulded cover of insulating material, the pole faces of the stator component being exposed. In fuel injector applications, the pole faces of the stator are often exposed to fuel at relatively high pressure, and there is a tendency for such fuel to cause the cover to separate from the stator component often resulting in the cover fracturing.

In order to reduce the risk of the cover separating from the stator component, it is known to provide a groove in the outer face of each outer limb of the stator component extending in a direction parallel to the pole faces of the stator component. When the cover is moulded onto the stator component, some of the insulating material of the cover enters the grooves providing a mechanical connection between the cover and the stator component adjacent the pole faces. An arrangement of this type is disclosed in GB 2252675.

The known construction has the disadvantages that the grooves extend across the full width of the stator component thus reducing the magnetic cross-section of the stator both where the mechanical connection is required and where the connection is not required. Further, the ends of the grooves can lead to stress concentrations in the cover material. Such stress concentrations may be acceptable where the cover material is relatively thick.

OBJECTS AND SUMMARY

It is an object of the invention to provide a stator in which these disadvantages are reduced.

According to the present invention there is provided a stator component comprising a body having first and second upstanding limbs, each limb defining a pole face, an outer surface of each of the first and second limbs facing away from the other of the first and second limbs being provided with a pair of elongate recesses extending across the respective outer surface, each recess extending at an angle to the pole faces, the recesses terminating at positions spaced from the edges of the respective outer surfaces.

Such a stator is advantageous in that, when an insulating cover is moulded around the stator, the mechanical connection between the stator and the cover is strongest at the centre of each of said surfaces, and as the recesses terminate at positions spaced from the edges of the surfaces, the critical stress concentrations are not formed.

One or more additional limbs may be provided between and extending parallel to the first and second limbs.

As the recesses are angled with respect to the pole faces, the length of each recess is greater than would be possible if the recesses were parallel to the pole faces, thus the mechanical connection occurs over a relatively greater length.

The stator component is conveniently laminated from a plurality of appropriately shaped plates, the recesses being formed in the stator body after the plates are laminated to one another. Conveniently, the recesses are formed using a plunge cutting technique.

The invention further relates to a method of constructing a stator component comprising the steps of laminating a plurality of plates to one another to form a body having first and second upstanding limbs, each limb defining a pole face, and plunge cutting a pair of elongate recesses into an outer surface of each of the first and second limbs which faces away from the other of the first and second limbs such that each recess extends across the width of the respective outer surface, terminating at positions spaced from the edges of the respective outer surface, the recesses extending at an angle to the pole faces.

As indicated hereinbefore, one or more additional limbs may be provided between and extending parallel to the first and second limbs.

BRIEF DESCRIPTION OF THE DRAWINGS

The invention will further be described, by way of example, with reference to the accompanying drawings, in which.

DESCRIPTION

The stator component 10 illustrated in the accompanying drawings comprises a stack of laminated sheets of generally E-shaped form, the plates being laminated together so as to form a body defining first and second outer limbs 12, 14 and an intermediate limb 16. The limbs 12, 14, 16 each terminate in a common plane, the end of each limb defining a pole surface.

Figure 1:
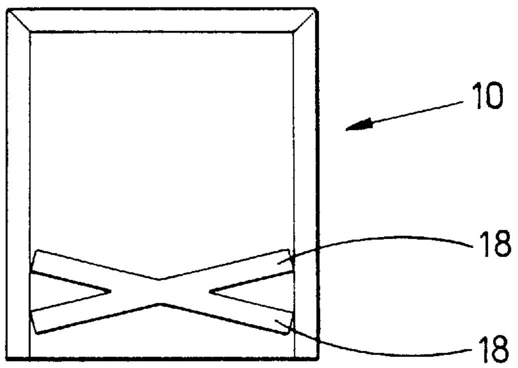
FIG. 1 is an end view of a stator component in accordance with an embodiment of the invention.

The first and second outer limbs 12, 14 each include an outer surface which faces away from the other of the outer limbs 12, 14, and a pair of recesses are formed in the outer surface of each of the outer limbs 12, 14. The recesses 18 extend across the width of the outer surface of each of the outer limbs 12, 14, the recesses 18 extending in a direction angled to the pole faces. In the illustrated embodiment, the recesses 18 are angled at approximately 15° to the plane of the pole faces. As shown in FIG. 1, the recesses 18 provided on each surface are located so as to intersect one another, the intersection between the recesses 18 being located half way across the width of the outer surface.

Figure 2:
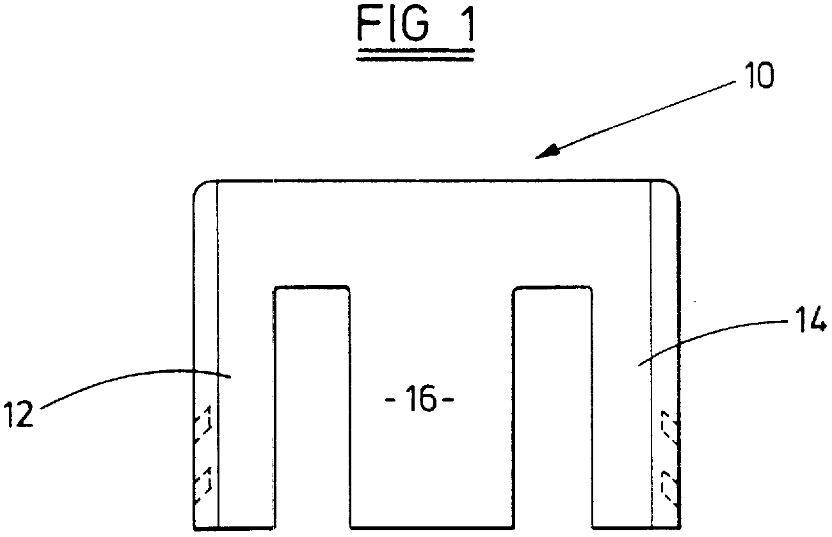
FIG. 2 is a side view of the stator component of FIG. 1 showing some hidden details.
Figure 3:
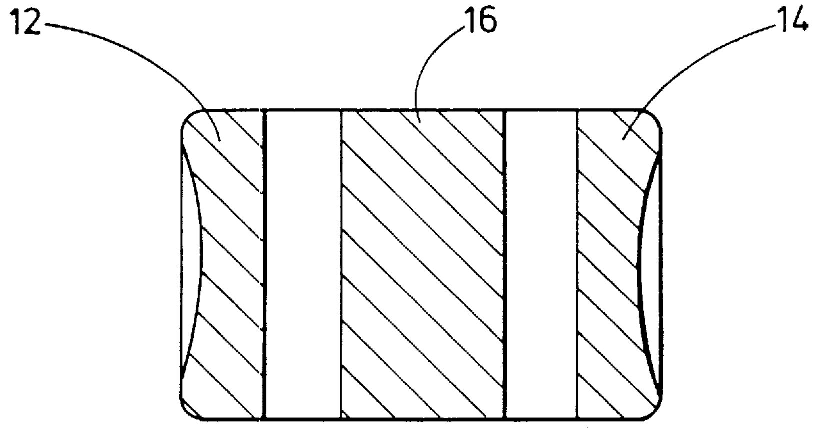
FIG. 3 is a view illustrating the magnetic cross-section of the stator component of FIG. 1.
Figure 4:
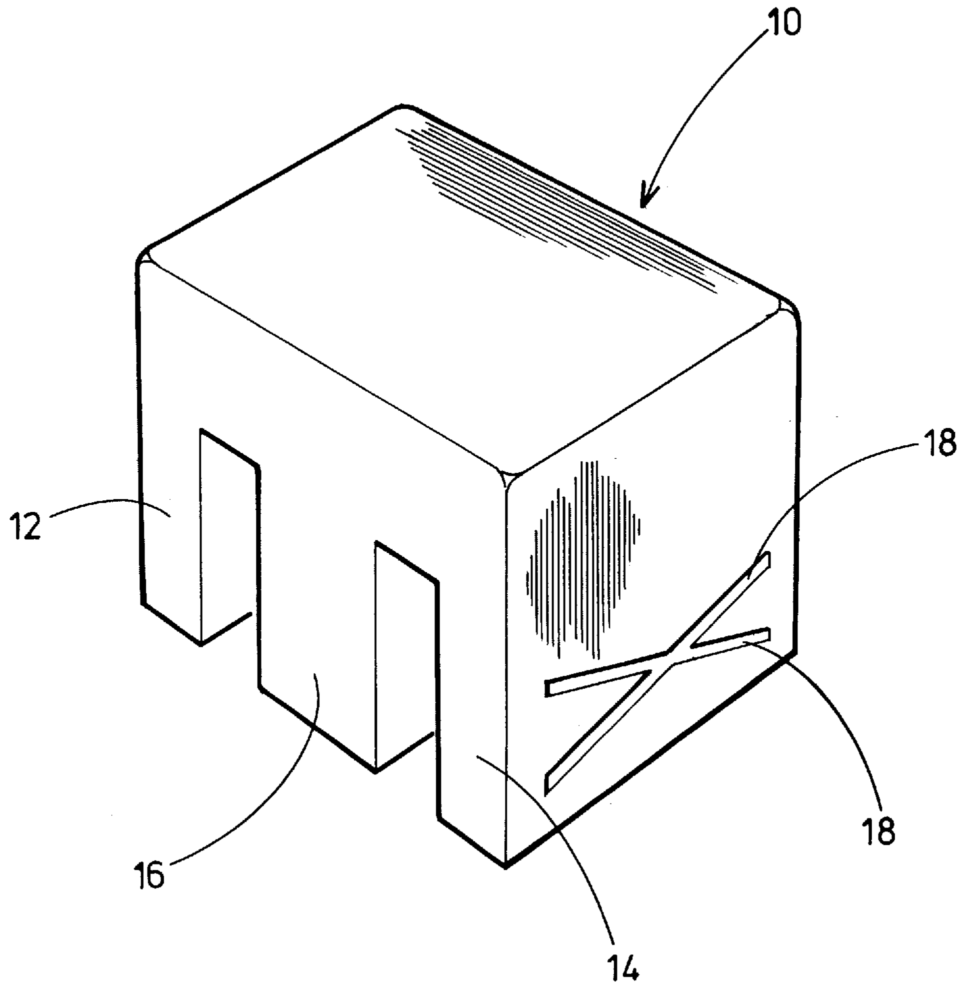
FIG. 4 is a perspective view of the stator component of FIG. 1.

The recesses 18 are formed in the laminated stack by using a plunge cutting technique using a rotary cutter, and as illustrated in FIGS. 2 and 3, in addition to the recesses 18 being angled such that each groove is at an angle to the pole faces, the plunge cutting technique used to form the recesses 18 is carried out in such a way that the cut into the outer surface of each limb is angled relative to the respective outer surface, for example at an angle of 45°.

As illustrated in FIGS. 1 and 3, the recesses 18 are of dimensions such that the ends of the recesses 18 are spaced from the ends of the outer surfaces of the limbs 12, 14. After forming the recesses 18 in the outer surfaces, the laminated stack is shaped so as to round the corners of the limbs 12, 14, and it will be noted that the recesses 18 do not extend into the radii at the edges of the outer surfaces.

Once the recesses 18 have been formed and the corners of the stator have been rounded, windings are provided around the intermediate limb 16, and a cover of insulating material is moulded around the stator 10, the cover terminating in a plane which includes the pole faces such that the pole faces are exposed whilst the remainder of the stator 10 is insulated by the cover. The moulding of the cover conveniently further includes the step of moulding terminal pins into the cover whereby electrical connection can be made to the windings.

It will be appreciated from FIG. 3 that the stator is advantageous in that the recesses 18 are of relatively great depth where a relatively strong mechanical connection is required between the stator 10 and the cover material, the depth of the recesses 18 reducing away from this point thus minimising any reduction in the magnetic cross-section available. It will be appreciated, therefore, that the provision of recesses 18 which do not extend across the full width of the outer surfaces improves the efficiency of the stator. As the recesses 18 extend in a direction angled to the pole faces, the recesses are of length greater than would be possible if the recesses extended parallel to the pole faces. The mechanical connection therefore occurs over a relatively greater length.

The rounding of the corners of the limbs reduces corner stresses in the cover material, and as the recesses 18 do not extend into the radii, the formation of stress concentrations is reduced.

What is claimed is:

1. A stator component comprising a body having first and second upstanding limbs, each limb defining a pole face, an outer surface of each of the first and second limbs facing away from the other of the first and second limbs being provided with a pair of elongate recesses extending across the respective outer surface, each recess extending at an angle to the pole faces, the recesses terminating at positions spaced from the edges of the respective outer surfaces.

2. A stator component as claimed in claim 1, further comprising at least one additional limb located between and extending parallel to the first and second limbs.

3. A stator component as claimed in claim 1, wherein each of the elongate recesses extends in a direction angled at approximately 15° at the plane of the pole faces.

4. A stator component as claimed in claim 3, wherein the recesses provided in each surface intersect one another.

5. A stator component as claimed in claim 1, which is composed of a plurality of plates laminated to one another, the recesses being provided using a plunge cutting technique.

6. A method of constructing a stator component comprising the steps of laminating a plurality of plates to one another to form a body having first and second upstanding limbs, each limb defining a pole face, and plunge cutting a pair of elongate recesses into an outer surface of each of the first and second limbs which faces away from the other of the first and second limbs such that each recess extends across the width of the respective outer surface, terminating at positions spaced from the edges of the respective outer surface, the recesses extending at an angle to the pole faces.

7. A method as claimed in claim 6, wherein the recesses are cut using a rotating cutter of circular form.

* * * * *